(12) United States Patent
Poder

(10) Patent No.: US 8,238,538 B2
(45) Date of Patent: Aug. 7, 2012

(54) STATEFUL HOME PHONE SERVICE

(75) Inventor: James Poder, Cheltenham, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 537 days.

(21) Appl. No.: 12/473,319

(22) Filed: May 28, 2009

(65) Prior Publication Data

US 2010/0303222 A1    Dec. 2, 2010

(51) Int. Cl.
*H04M 3/42* (2006.01)

(52) U.S. Cl. ......... 379/207.12; 379/211.02; 379/211.04; 379/212.01

(58) Field of Classification Search ............. 379/207.12, 379/37, 211.04, 211.02, 212.01, 201.01
See application file for complete search history.

(56) References Cited

U.S. PATENT DOCUMENTS

| | | | |
|---|---|---|---|
| 2005/0013426 A1 | 1/2005 | Ooki | |
| 2006/0140356 A1 | 6/2006 | Bossemeyer, Jr. et al. | |
| 2007/0274461 A1* | 11/2007 | Bennett et al. | 379/37 |
| 2008/0318561 A1 | 12/2008 | Olshansky et al. | |

FOREIGN PATENT DOCUMENTS

| | | |
|---|---|---|
| WO | 0141457 A2 | 6/2001 |
| WO | 2006036356 A1 | 4/2006 |

OTHER PUBLICATIONS

Mahy, et al., "A Call Control and Multi-Party Usage Framework for the Session Initiation Protocol (SIP)", http://www.ietf.org/internet-drafts/drafts-ietf-sipping-cc-framework-10.txt, Internet, Apr. 16, 2008, p. 12, The IETF Trust.

"ESI Presence Management for ESI Business Phone Systems—Details", http://www.esi-estech.com/products/systems/presence/details.php, Internet, Feb. 3, 2009 (Date of Access), Estech Systems, Inc., Plano, Texas.

* cited by examiner

*Primary Examiner* — Thjuan K Addy
(74) *Attorney, Agent, or Firm* — Banner & Witcoff, Ltd

(57) ABSTRACT

This application describes a system and associated method for routing messages, such as phone calls. The destination of incoming calls may be determined based on a variety of factors, such as the state of the callee's security system, the date and time, the identity of the caller, and the number of recent call attempts by the caller. Potential destinations include all or a subset of the phones associated with a subscriber and outside phones, such as cellular phones operated by third parties. The rules used to route calls may be defined or modified via a web interface.

13 Claims, 3 Drawing Sheets

US 8,238,538 B2

STATEFUL HOME PHONE SERVICE

FIELD OF THE DISCLOSURE

The present disclosure relates to a system and method for routing incoming messages to one or more destinations based on information about the call and the callee's environment, such as the state of the callee's security system.

BACKGROUND

In traditional telephone systems, the mapping between telephone numbers and the phones that ring in response to a call is generally fixed. All calls are delivered to the same destination, regardless of factors such as when the call is made, or the recipient's current status. More sophisticated systems may permit users to have their calls forwarded to another phone, but users often neglect such call forwarding features because they are too cumbersome to use. Accordingly, there remains a need for easy-to-use systems to allow users to receive incoming calls at different locations.

BRIEF SUMMARY

This summary is not intended to identify any critical or key elements, but instead merely presents certain introductory concepts so that the full scope of the claims may be appreciated upon reading the full specification and figures, of which this summary is a part.

In general terms, features described herein allow for incoming messages, such as phone calls, emails, text messages, etc., to be routed to different destinations based on a variety of factors generally related to the environment of the callee. By using this context-sensitive information, calls may be routed in a more convenient manner.

According to one aspect, the state of a security system associated with a callee may be used to determine where to route calls. For example, a home security system in its fully armed state may indicate that no one is home, so incoming calls may be routed elsewhere. Thus, incoming calls to a home may be routed to a cellular phone or to voicemail instead, when no one is home. Time of day may also factor into the routing decision making, so for example, a call received at a time when users are normally asleep may be automatically routed to a voicemail server. Alternatively, phones might only be rung in certain areas of the house, based on time of day. For example, during the night hours, a user might only want calls to ring phones located in non-bedrooms, so as to only disturb those who are awake. As another alternative, such nighttime calls may be routed only to bedrooms, to ensure that the occupant is alerted to the call.

According to another aspect, the location of the intended recipient of a message is used to determine where to send the message. For example, a security system may track a user's location by noting which door a user has opened with his RFID badge. Messages may then be delivered to devices at or near the user's location.

According to another aspect, a motion detector (e.g. an infrared sensor) may be used to determine where to send a message. For example, if there is movement detected within an office, then calls to a number associated with the office may ring only the phone(s) in the office. But if the office is not occupied, then a number of alternative routings may be used. For example, the call could cause an alternative phone at the premises to ring, the call could be sent directly to voicemail, or the call could be forwarded to a cellular phone.

According to yet another aspect, which user placed the security system into its current state may be used to determine where to route messages. For example, if a housekeeper or other visitor disarmed the security system, then messages that are phone calls may be forwarded to a cellular phone. But if an occupant disarmed the security system, then messages that are phone call may then cause phones at the premises to ring.

According to another aspect, a destination may include more than one endpoint. For example, some calls may cause one or more phones to ring, but the call may also be sent to call-recording equipment so the call can be saved for later review. A mapping of security system settings and/or other factors to message destinations may be stored in a memory.

Other features and advantages will be apparent upon reading the detailed description set forth below. The claims herein are not intended to be limited in any way by this brief summary.

DETAILED DESCRIPTION

A common type of security system is an intrusion detection system. Intrusion detection systems typically include a control panel that receives input from various sensors, such as motion detectors, door/window opening detectors, or glass-break sensors. The control panel may use the inputs from the sensors to sound an alarm. Other types of security systems include systems that detect the presence of fires, floods, dangerous gases, or other phenomena within or around a secure area, such as a building.

Security systems can be placed into various states. For example, a security system in an "armed" state may be configured to sound an alarm and/or call the authorities (or monitoring company) in response detecting movement within the monitored premises, or an opening of a closed door or window. The same security system in an "unarmed" state may note the opening of a door/window, or detect movement, but without sounding an alarm. Depending on the configuration of the security system, such as the number and type of sensors, a very large number of states are possible. Another example of a state of a security system is a "sleep" state. In this state, the security system may sound an alarm in response to a door being opened or glass breaking, but not in response to movement from within the monitored premises, to allow for occupant movement within the secure premises.

Sometimes security systems have multiple users who each have a unique identification code, radio frequency identification (RFID) badge, or other way of identifying themselves to the security system. Security systems may also include multiple zones. Each of these possibilities increases the number of potential states for a security system. For example, a security system may be configured to sound an alarm if movement is detected in one zone, but to ignore movement detected in another zone. Or the security system may respond to certain phenomena only if a particular user has not entered his identification code.

A security system may count the number of users who have entered or exited a certain zone (e.g., rooms in a house, offices, etc.). This count would be part of the system's state.

Such a count may be useful because the security system may automatically arm when the last user exits a zone.

Figure 1:
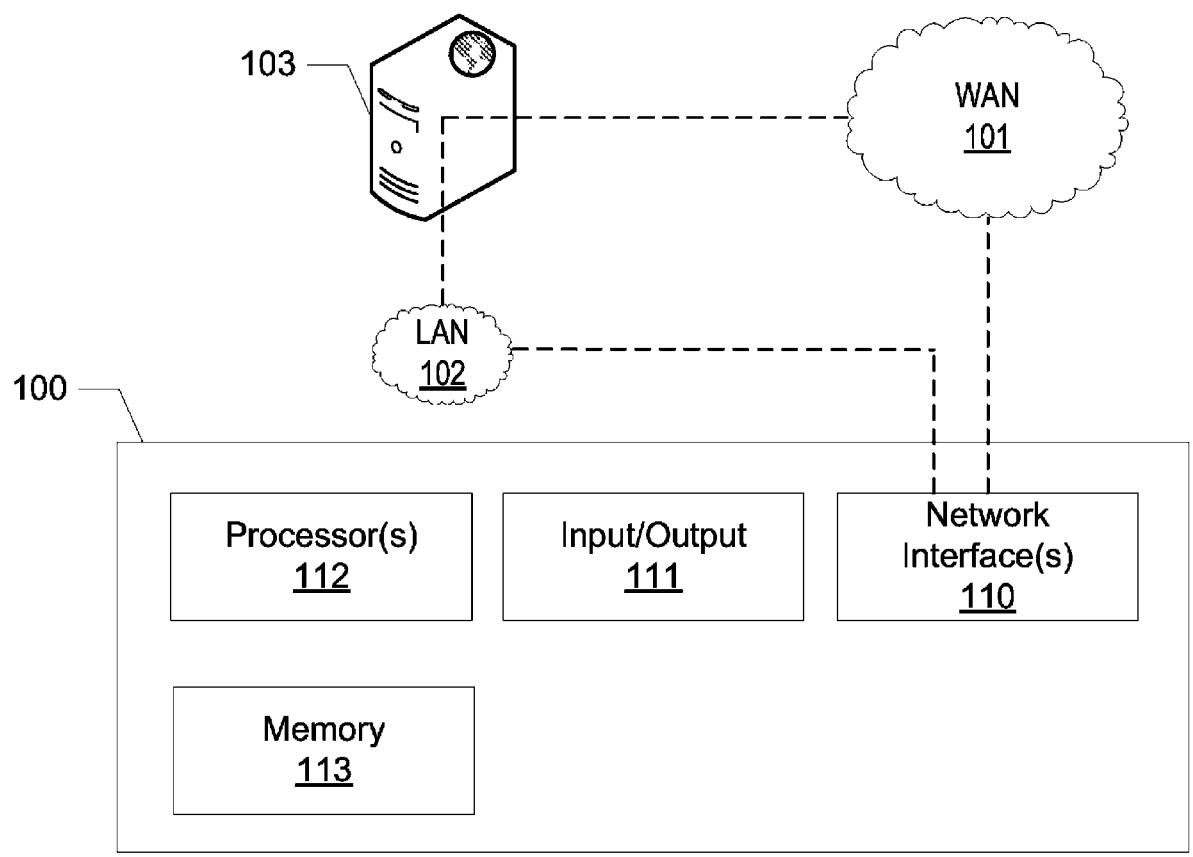
FIG. 1 is an illustrative embodiment of a computing device with call routing features described herein.

FIG. 1 illustrates one example of a computing device 100 that may be used to implement one or more features described herein. The computing device 100 (discussed below) may be connected to various networks outside the premises (e.g., outside the home), such as a wide area network (WAN) 101 (e.g., the Internet), local area network (LAN) 102, wireless/cellular network (not shown), or others. The specific connection may be via coaxial cable, optical cable, satellite, cellular wireless, or whatever other type of connection is desired. On those external networks, there may be any number of servers 103 (e.g., web server, telephone call routing computer, etc.) that can communicate with the computing device 100. Computing device 100 may be any type of computing device capable of performing the functions described herein. For example, computing device 100 may be a standalone PC, a rack-mounted server, a home media system, a security system panel, a cable modem, a set top box, etc.

Various network nodes, such as computing device 100 and external web server 103, may be interconnected via the wide area network (WAN) 101. Other networks may also or alternatively be used, including private intranets, corporate networks, LANs, wireless networks, personal networks (PAN), the public switched telephone network (PSTN), and the like. Network 101 is for illustration purposes and may be replaced with fewer or additional networks. A local area network (LAN) 102 may have one or more of any known LAN topology and may use one or more of a variety of different protocols, such as Ethernet. The connection of computing device 100 to any networks may be achieved through one or more network interfaces 110. The network interfaces may use a variety of communication means, including twisted pair wires, coaxial cable, fiber optics, radio waves, or other means of communication. Other devices (not shown) may be connected to computing device 100 through input/output interfaces 111 (e.g., keyboard, mouse, display, printer, external storage, etc.). Interfaces 111 may also include connections to the various sensors (e.g., motion detectors, doorway/window detectors, etc.) of a home security system.

Computing device 100 may include one or more processors 112, and may include one or more computer-readable memories 113. Memories 113 may include any desired type of data storage, such as hard drive, flash memory, diskette, compact disk, etc.

One or more aspects described herein may be embodied in computer-executable instructions and/or computer-usable or readable data stored in memory 113. The instructions may be one or more program modules, executed by one or more processors 112 or other devices as described herein. Program modules may include routines, programs, objects, components, data structures, etc. that perform particular tasks or implement particular abstract data types when executed by a processor in a computer or other device. The modules may be written in a source code programming language that is subsequently compiled for execution, or they may be written in an interpreted language or a scripting language such as (but not limited to) HTML or XML. The computer executable instructions may be stored on a computer readable medium such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As noted above, the functionality of computing device 100, server 103, or other computing devices (not shown) described herein may be spread across multiple computing devices. In certain situations it may be advantageous to distribute processing load across multiple devices, to segregate transactions based on geographic location, user access level, quality of service (QoS), etc. FIG. 1 illustrates just one example of a computing device that may be used, and the devices used may vary, and are secondary to the functionality that they provide, as further described herein.

Figure 2:
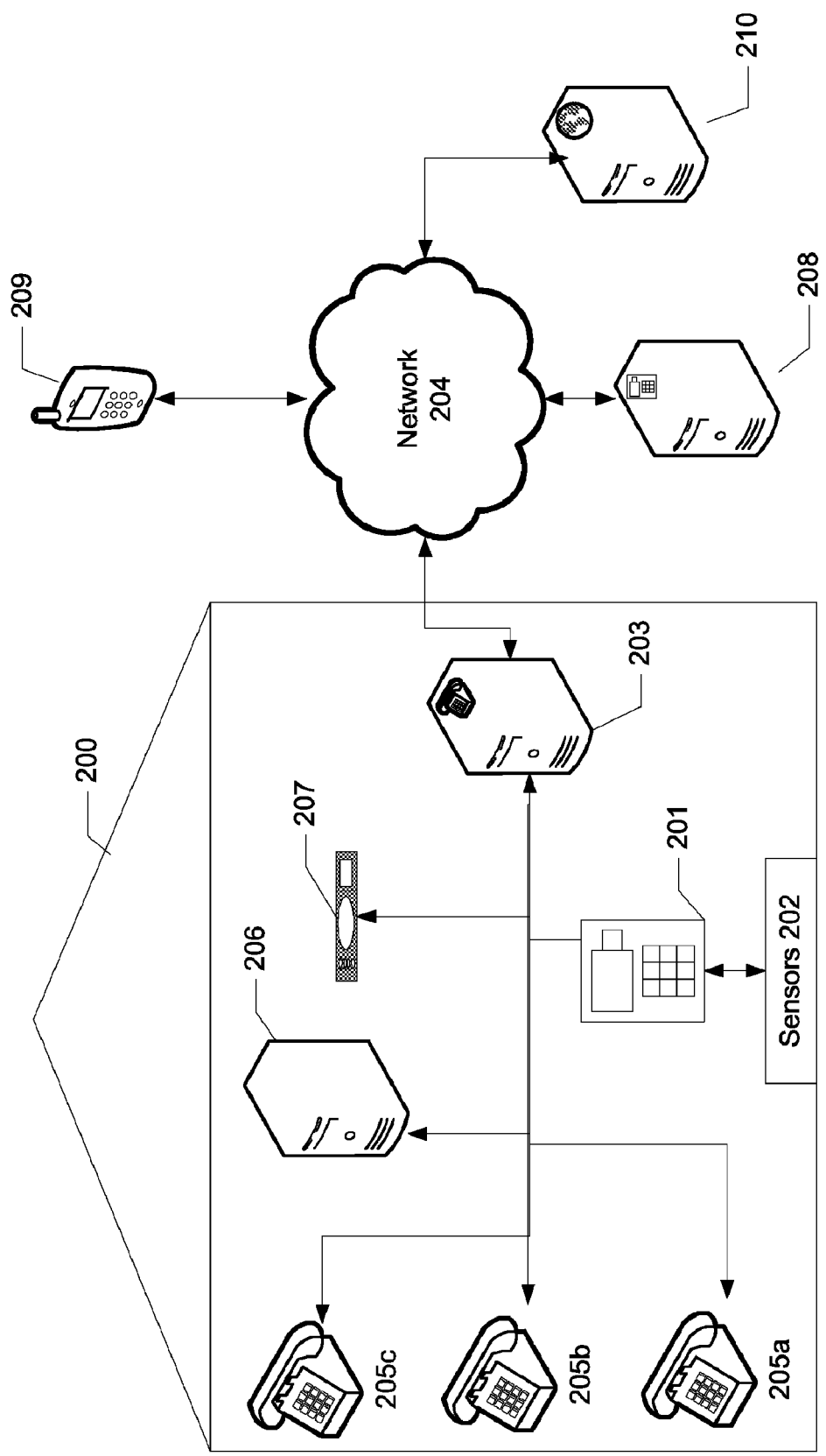
FIG. 2 illustrates one embodiment of a system for routing phone calls.

FIG. 2 shows an illustrative configuration of a premises 200, such as a home, having a security system. In FIG. 2, home 200 contains a security system computer 201, which may be connected to various security sensors 202 around the home (e.g., motion detectors, door/window sensors, etc.), and which may be placed into a variety of states (e.g., unarmed, sleep, away, etc.) by the user.

The home 200 may also include a message routing computing device 203, such as a call router. The call router 203 may be connected to an external network 204, such as a PSTN, coaxial cable network, fiber, etc., and may receive incoming communications (e.g., incoming phone calls) for the home 200, and may direct those communications to different locations. The different locations may be individual telephones 205a-c within the home 200, computers 206, set-top boxes 207, or any other desired location to which a message may be directed. The communication interconnections shown among the home devices in FIG. 2 may be made using any desired connection, such as a home's internal coaxial cable wiring, CAT-5 Ethernet wiring, power system, local wireless, etc.

Call router 213 may route incoming calls based on a number of factors. One factor may be the state of security system 201. For example, if security system 201 is in a "sleep" state, and the home occupants do not wish to receive calls while sleeping, then call router 203 may redirect all incoming calls to a voicemail computer 208, which may be located at a different location on the network 204.

On the other hand, if security system 231 is in a disarmed or "at home" state, then users may wish to receive incoming calls, and call router 213 may cause one or more of phones 205a-c to ring when an incoming call is received. If one or more of telephones 205a-c are not answered, then call router 203 may send the call to voice server 208, or a home answering machine (which may be implemented using routing computer 203). If security system 231 is in an armed or "not at home" state, and users wish to have incoming calls routed to a different, external location, then call router 213 may forward calls to an external phone, such as a cellular telephone 209 (or to a cellular network supporting the cellular telephone).

Users may also wish to have incoming calls routed to a different, external location if security system 231 is in a "visitor" or "kid" state. Examples of "visitor" states include when non-residents such as housecleaners, handymen, dog walkers, baby sitters, etc. disarm the system. Examples of "kid" states include when a child disarms the security system. Routing some or all calls to an external location, or to voicemail, while in a "visitor" or "kid" state keeps visitors and children from intercepting calls. Optionally, the ability to retrieve voicemail from phones 205a-c may also be wholly or partially restricted, as appropriate, while in a "visitor" or "kid" state.

Routing based on a "visitor" or "kid" state may be accomplished by querying the security system to determine its state and the identity of the individual who placed the security system in that state, and then routing calls to or away from phones 205a-c based on the response. The response may indicate a general state of the security system, such as "visitor." The response may also indicate a more specific state. For example, if routing will be performed on the basis of the identity of the user who last disarmed the security system, then this information may be included in the response. Instead of a sending a response, the security system may transmit its state without waiting for a query, or it may store its state in a table or other memory. Calls may then be routed based on the identity of the visitor or kid who disarmed the security system. For example, if Jim the plumber last disarmed the security system by entering his unique code into a keypad, then calls may continue to be routed as if the system were still armed, such as forwarding calls to one or more cellular phones. If Johnny, a child resident, last disarmed the security system by entering his unique code, then some or all calls may cause phones 205a-c to ring.

In one aspect, each of phones 205a-c (and other devices within the home) may be associated with a different phone service subscriber, and may be individually addressable by the router 203. For example, if telephone numbers are being used, then a different telephone number (or address) may be associated with each phone 205a-c. If user names are being used, then calls to one username may go to phone 205a, calls to a second username may go to phone 205b, etc. Multiple combinations of users and phones may be used, such as mapping multiple phones to a single user, mapping multiple users to a single phone, mapping groups of users to groups of phones, etc. Each user and/or phone may also be associated with a separate mailbox on the voicemail server 208.

Individually addressable phones (or other devices) may be caused to ring based on user preference. For example, if the phones 205a-c are individually addressable, and if the user wishes, then only some of phones 205a-c may ring in response to a call. For example, if home security system 201 is in a "sleep" state in which the user does not want incoming calls to disturb sleeping occupants, call router 203 may cause only phone 205a, located on a lower level of home 200, to ring in response to a call. Phones 205b-c may be located in or near bedrooms, and may not ring.

The mapping of users to phones may be adjusted dynamically based on a user's location within the home. For instance, the security system may monitor the location of individual users by having RFID detecting sensors positioned at different locations and monitoring movement of RFID tags within the home. Or, the system may have movement sensors in different bedrooms, and may be programmed to determine that the bedroom's assigned occupant is in that room if there is motion detected in that room (e.g., motion in Sue's room means Sue is in that room). Or, users may simply key in their presence (or absence upon leaving) to the system computer 201. When an incoming call is received for the user, the router 203 (through the security system 201) may determine the current location of the desired user, and may ring just the phone near the user's current location.

Calls may also be routed to other locations outside the home if the security system 201 reports that the desired recipient is not within the home. So, for example, if security system 201 determines that Sue is not in building 200, then calls for Sue may be sent to her cellular phone or to her voice mailbox. Calls to other users may still be routed to phones in the home 205a-c.

Incoming calls may also be routed based on the identity of the caller. For example, if John and Sue share a single subscriber account, they may configure call router 203 to send calls from certain numbers to phone 205b, which may be in John's room, and calls from other numbers to phones 205a,c. In another example, calls from John's workplace and family may be forwarded to John's cellular telephone, and calls from Sue's friends may be forwarded to Sue's cellular telephone. In yet another example, all calls from a list of callers may be allowed to ring some or all of phones 205a-c, regardless of how calls from other callers would be routed. For example, calls from a list of callers may ring some or all of phones 205a-c, regardless of the state of the security system. Conversely, calls from a list of callers may always be sent to a "call blocked" message or to voicemail, regardless of how calls from other callers would be routed.

Call router 203 may also change its routing of calls based on prior behavior of the caller, such as repeated unsuccessful attempts within a predetermined time period. For example, if a caller calls John more than three times in five minutes, the next attempt may be routed differently, such as directly to voicemail, or to a different device, depending on John's preference. In this way, urgent calls may reach John even though normal calls would not disturb him.

Call router 203 may also take the time or date into account. For example, call router 203 may send all calls to voicemail when the security system is first placed into a sleep state, but it may allow those calls to ring one or more of phones 205a-c after a set time or a calculated time. For example, a call may be allowed though after the security system has been in the sleep state for eight hours. Other examples include allowing calls through after a specific time (e.g., after 8 a.m.), after sunrise, or after some predetermined number of minutes before or after sunrise.

Call routing may also vary with the date. For instance, calls may be routed differently on weekends than on weekdays. Calls may be allowed to ring one or more of phones 205a-c after 8 a.m. on normal weekdays, but calls may not be allowed to ring phones 205a-c until after 10 a.m. on weekends or holidays when the security system is in a sleep state.

Call router 203 may also take into account the time at the destination to which the call is to be routed. For instance, if a call may be forwarded to a cellular phone, the call router may take the time zone in which the cellular phone is located into account. This may prevent calls from ringing a traveler's cellular phone in the middle of the night. Information about the location of a cellular phone may be received from a user or retrieved automatically. Examples of automatic retrieval include receiving communications from the cellular phone itself and receiving communications from location-tracking services, which communicate with either the cellular phone or the cellular service provider, or receiving the information from a cellular phone service to which the phone has registered its location.

The operator of call router 203 may implement a number of default call routing rules, such as that calls are sent to voicemail when the home security system is in a sleep state. Subscribers may modify the call routing rules using, for example, a keypad on the security system computer 201, a computer and web interface, etc. The web interface may allow users to specify or modify both a default rule, i.e. a rule that applies generally, and exceptions to that default rule. For example, a default rule may be that when the security system is in a certain state, all calls go to voicemail. An exception may be that calls from a certain person or group are forwarded to a cellular phone instead of going to voicemail.

The web interface may allow users to specify rules for routing phone calls based on a variety of factors, including the state of security system 201 (including information about how the security system will respond to inputs from its sensors, information detected by the sensors themselves, and information about individuals, such as that Sue has not typed her id code into the security system today). Other factors on which call routing may be based include the origin of a call, such as the number that appears in caller ID, the identity of the callee (such as which of several phone numbers associated with building 230 were dialed), the number of recent call attempts (such as if a caller attempts to call three times in five minutes), the date (such as whether it is a weekday, weekend, or holiday), the time, etc.

Where rules for routing phone calls are based on the phone number of the recipient or callee, wildcards may be used. In other words, if a user wishes to specify that calls from 555-5550, 555-5551, 555-5552, ..., 555-5559 are to go to voicemail, the user may affect this functionality in more than one way. One way would be to make a rule that says, calls from 555-555* are to go to voicemail. (Here, the * indicates that any number may be in the last position.) The user may also define a list containing all of the callers whose calls should be sent to voicemail. Alternatively, the user may create multiple separate rules for each caller. I.e. "Calls from 555-5550 go to voice mail" would be one rule, and "Calls from 555-5551 go to voicemail" would be another.

The rules may route calls to various destinations. The destinations may include cellular phones, subsets of the phones that are available with building 200, voicemail, busy signals, messages that calls have been blocked, office phones, call recording equipment, etc. It may be advantageous to allow users to give names to destinations or lists of phone numbers within the web interface. For example phones 205b and 205c may be called "upstairs phones" and all numbers beginning with 555-555 may be called "accounting department." This allows the routing rules to be defined in a user-friendly manner. For example, the user may now specify that calls from "accounting department" go to the destination "upstairs phones" on weekends.

Similarly, it may be advantageous to allow users to give names to states or groups of states of security system 201, as well as to other items on which call routing may be based. For example, if security system 201 has multiple zones (e.g., multiple rooms having monitoring devices), it may be advantageous to allow the user to define a name, such as "guesthouse armed," to describe states when some of the zones are set to sound an alarm. Default names for various states or groups of states of security system 201 may be provided. Default names for groups of dates may also be provided, such as "weekends," "weekdays," and "holidays."

Users may be able to specify call routing rules through a variety of user interfaces. For example, the user may type in rules such as "if security system is armed, then forward all calls to Bob's phone" into a text box. Alternately, the user may build such a rule using drop-down boxes, radio-boxes, etc.

Instead of or in addition to the web interface described above, users may also change call routing rules using a customized software application. In addition, call center employees may operate the web interface or customized software application in response to user requests received over the phone or in writing.

As shown in FIG. 2, web server 210 is connected to call router 203 via the network 204. Users may interact with web server 210 in order to define the routing rules for their account. Web server 210 then communicates those rules to call router 203. Alternately, call router 203 may query web server 210 in order to retrieve routing rules as needed (e.g., the call router 203 may transmit a message containing the incoming caller id, call type, etc., to the server 210, and may receive a response instructing the router 203 on where to route the call). Finally, a third server, separate from both call router 203 and web server 210, may house the routing rules. The various components illustrated may be combined/separated as desired, and are not limited to the particular configuration shown in the figure.

Locations may be altered as well. While the call router is shown inside of building 200 in FIG. 2, some or all of the elements of its functionality may be implemented at other locations. For example, decisions about which of phones 205a-c to ring may be handled by hardware located outside the home 200.

The connections between and locations of components shown in FIG. 2 are conceptual, not necessarily physical. For instance, the voice mailboxes may be physically housed at a datacenter located outside of building 200. Also, a service provider may have only a single line, such as a coaxial cable or fiber optic cable, leading into building 200. Security system 201 and phones 205a-c may be directly connected to that line. Alternatively, any or all of these components may be connected to the line indirectly. For example, any of phones 205a-c may connect to traditional twisted pair copper wiring used to provide traditional telephone service.

Other connection methods, such as radio transmissions, may also be used. For instance, one or more of phones 205a-c may be cellular phones, and security system 201 may communicate with other devices wirelessly. Phones 205a-c (as well as security system 201) may also be directly connected to the internet This may be advantageous, for example, where the phone is implemented in software on a general-use computer.

Figure 3:
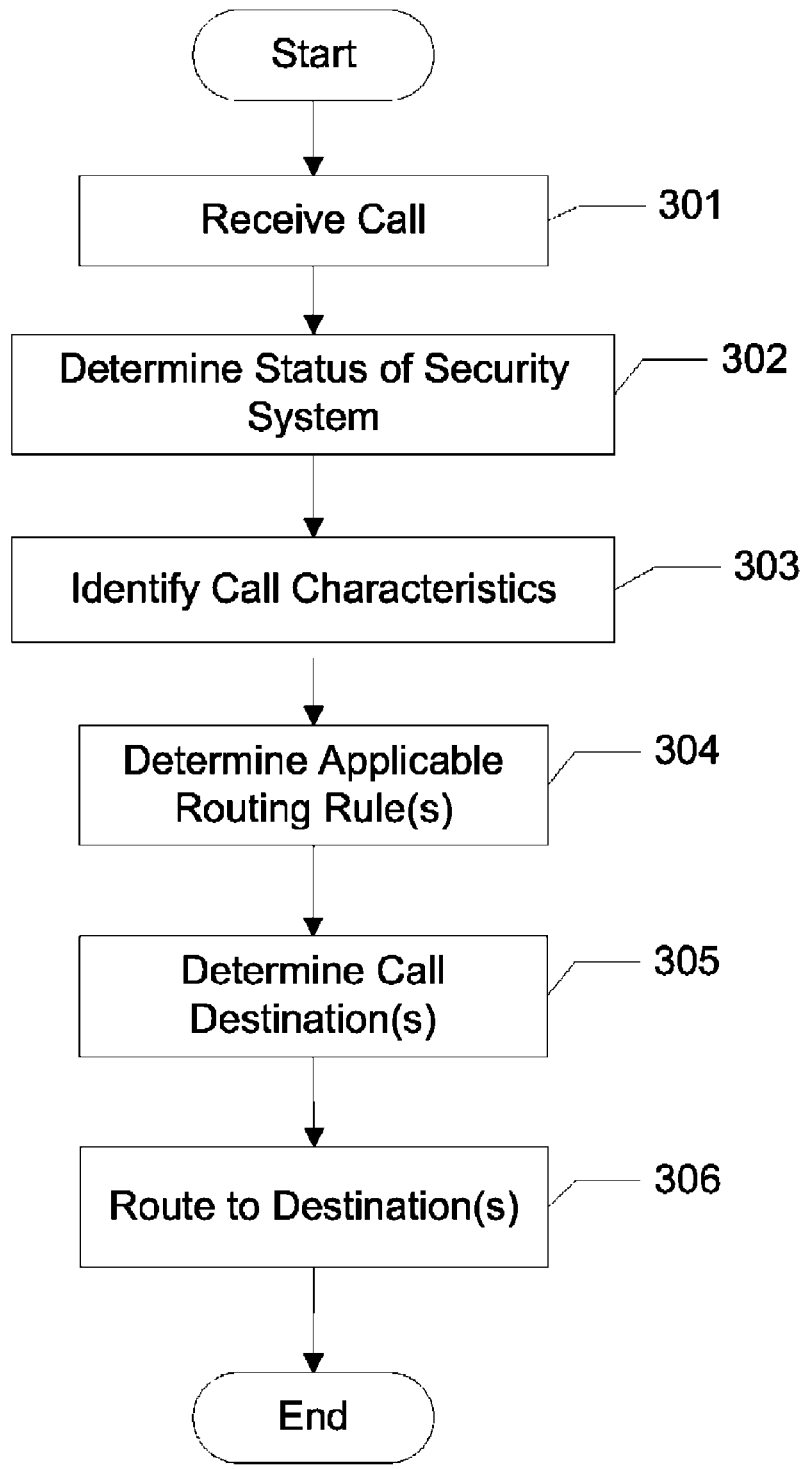
FIG. 3 shows a method for routing calls using features described herein.

FIG. 3 illustrates a method of routing calls in accordance with some aspects described herein. The decisions and steps shown in FIG. 3 are shown for illustrative purposes. Many variations of the illustrated method are possible. The decisions and steps shown may be removed, combined, or re-ordered while still obtaining identical or satisfactory results. Other steps or decisions may be added.

In step 301, a call (or other incoming message, such as email, text message, SMS, etc.) is received. In step 302, the routing computer 203 may determine the security state of the security system 201. This may be accomplished, for example, by transmitting a query to the security system computer 201. Alternatively, the security system 201 may periodically report its status to the call routing computer 203, which may store information identifying the status of the security system 201. The status information may identify the current mode (e.g., armed, unarmed, sleep, etc.), as well as user presence information, such as the location(s) of the home's occupants.

Then, in step 303, information about the received call, such as the caller's identification, the callee's identification, the state of the security system, the number of recent call attempts from the caller, the call type, message duration, etc, may be determined. The items listed in may be determined or identified at a later point in time. They are listed together in step 303 for conceptual simplicity.

In step 304, the applicable routing rules may be retrieved and consulted. The rules may be maintained in a database on, for example, the router 203. Rules may be deemed applicable based on the combination of security state and call characteristics (e.g., one predetermined rule may apply for calls from John received while the security system is armed "away").

In step 305, the applicable rule may be applied to the combination of security status and call characteristics, and the destination for the call may be determined. So, for example, the applicable rule may dictate that calls from John received while the system is armed "away" should be forwarded to Sue's mobile telephone. Alternatively, if Sue is determined to be at home and in her room, the applicable rule may dictate that the call from John be forwarded to the specific phone in Sue's room. In step 306, the call may be routed to the determined destination.

The table below illustrates an example combination of rules that may be established by the home occupant using any desired interface to the security system 201 and routing system 203 (e.g., web interface, computer display, keypad, etc.). As illustrated, the rules may implicate the setting of the security system, the caller identity, time of day, address of destination (e.g., an Internet Protocol address) etc.

| Security State | Caller ID | Time of Day | Destination |
| --- | --- | --- | --- |
| Unarmed | John | Any | 200.200.200.200 (Sue's Room) |
| Unarmed | Sam | Any | 200.200.200.100 (Jay's Room) |
| Armed/Away | John | 9 am-5 pm weekday | 200.200.200.300 (voicemail) |
| Armed/Home | Any | Any | 200.200.200.500 200.200.200.501 200.200.200.502 (Ring all Phones) |

While the features herein have been described with respect to specific examples, there are numerous variations and permutations of the above described systems and techniques that may be made. For example, illustrated steps and elements may be combined, divided, and rearranged as desired. Additional elements and steps may be added and/or inserted among those depicted.

The invention claimed is:

1. A message routing method, comprising:
   receiving, at a message routing computing device, a first telephone call to a first number;
   determining an identity of an intended recipient of the first telephone call;
   routing the first telephone call to cause a first telephone at a premises to ring without causing a second telephone at the premises to ring based at least in part on a first set of information received from a security system of the premises;
   wherein routing the first telephone call is performed by:
      determining a location of the intended recipient of the first telephone call within the premises; and
      selecting the first telephone to receive the first telephone call based on the location of the intended recipient of the first telephone call;
   receiving, at the message routing computing device, a second telephone call to the first number; and
   routing the second telephone call to cause the first telephone and the second telephone at the premises to ring simultaneously based at least in part on a second set of information received from the security system of the premises.

2. The method of claim 1, wherein determining a location of the intended recipient is performed, at least in part, by:
   determining a location associated with the intended recipient; and
   receiving an indication of the presence or absence of movement at the location associated with the intended recipient.

3. The method of claim 1, wherein the first set of information received from the security system includes an indication of a state of the security system.

4. The method of claim 1, wherein the first set of information received from the security system includes an indication of who placed the security system into its current state.

5. The method of claim 1, further comprising storing in a memory, by the message routing computing device, information identifying phone call routing destinations based on different alarm settings of the security system.

6. One or more computer-readable media storing executable instructions that, when executed, perform the following:
   receiving, at a message routing computing device, a first telephone call to a first number;
   determining an identity of an intended recipient of the first telephone call;
   determining a location of the intended recipient within a premises based on a first set of information received from a security system of the premises;
   routing the first telephone call to cause a first telephone at the premises to ring without causing a second telephone at the premises to ring based on the location of the intended recipient;
   receiving, at the message routing computing device, a second telephone call to the first number; and
   routing the second telephone call to cause the first telephone and the second telephone at the premises to ring simultaneously based at least in part on a second set of information received from the security system of the premises.

7. The one or more computer-readable media of claim 6, wherein the first set of information received from the security system includes an indication of a presence or absence of movement at a location associated with the intended recipient of the first telephone call.

8. The one or more computer-readable media of claim 6, wherein the first set of information received from the security system includes an indication of a state of the security system.

9. The one or more computer-readable media of claim 6, wherein at least one of the first and second sets of information received from the security system includes an indication of who placed the security system into its current state.

10. The one or more computer-readable media of claim 6, wherein the instructions, when executed, also perform:
   storing information identifying phone call routing destinations based on different alarm settings of the security system.

11. A system for routing messages comprising:
   a message routing computing device communicatively coupled to a home security system computing device and to an external communication network, the message routing computing device including a processor configured to:
      receive a message from the external communication network;
      determine an intended recipient of the message; and
      route the message based on whether a movement detector of the home security system detects movement at one or more locations associated with the intended recipient of the message, wherein the message routing computing device is further configured to:

route some phone calls to a first telephone number to a first telephone at the premises monitored by the home security system but not to a second telephone at the premises; and route other phone calls to the first number to both the first telephone and the second telephones at the premises;

wherein the telephones to which a call is routed are based at least in part on information from the home security system computing device.

12. The system of claim 11, wherein the message routing computing device is also configured to route the message based on a state of the home security system computing device.

13. The system of claim 11, wherein the message routing computing device is also configured to route the message based on information identifying an individual who placed the home security system computing device into its current state.

* * * * *